United States Patent
Rudzewicz et al.

Patent Number: 5,416,728
Date of Patent: May 16, 1995

[54] SYSTEM AND METHOD FOR DETERMINING AMBIENT TEMPERATURE OUTSIDE OF A VEHICLE

[75] Inventors: Robert G. Rudzewicz, Sterling Heights; Robert P. Hennessee, Rochester Hills, both of Mich.; Pascal Dutfoy, La Verriere, France; Annette B. Juhasz, Morris Plains, N.J.

[73] Assignee: Chrysler Corporation, Highland Park, Mich.

[21] Appl. No.: 69,479

[22] Filed: Jun. 1, 1993

[51] Int. Cl.$^6$ .................. G01K 1/20; G06F 15/20
[52] U.S. Cl. ................. 364/557; 364/424.05; 340/449; 340/588; 374/142; 374/144
[58] Field of Search ............... 364/557, 424.01, 424.05; 340/449, 588; 374/142, 144; 324/99 R, 99 D

[56] References Cited

U.S. PATENT DOCUMENTS

| | | | |
|---|---|---|---|
| 3,723,964 | 3/1973 | Lace | 340/52 F |
| 4,055,995 | 11/1977 | Armstrong et al. | 73/116 |
| 4,298,947 | 11/1981 | Tamura et al. | 364/557 |
| 4,309,759 | 1/1982 | Tokuda et al. | 364/431.05 |
| 4,317,106 | 2/1982 | Hüber | 340/52 F |
| 4,442,424 | 4/1984 | Shirsaki et al. | 340/52 F |
| 4,489,311 | 12/1984 | Lang et al. | 340/501 |
| 4,534,214 | 8/1985 | Takahashi | 73/118 |
| 4,542,461 | 9/1985 | Eldridge et al. | 364/424 |
| 4,551,801 | 11/1985 | Sokol | 364/424 |
| 4,555,691 | 11/1985 | Hosaka et al. | 340/52 R |
| 4,564,916 | 1/1986 | Hori et al. | 364/551 |
| 4,574,265 | 3/1986 | Kaiser et al. | 340/52 R |
| 4,575,806 | 3/1986 | Aldrich et al. | 364/557 |
| 4,580,221 | 4/1986 | Isobe et al. | 364/431.05 |
| 4,695,823 | 9/1987 | Vernon | 340/58 |
| 4,770,543 | 9/1988 | Burghoff et al. | 374/142 |
| 4,787,039 | 11/1988 | Murata | 364/424.01 |
| 4,794,803 | 1/1989 | Osterhout et al. | 73/865.1 |
| 4,853,693 | 8/1989 | Eaton-Williams | 340/588 |
| 4,857,889 | 8/1989 | Terano et al. | 340/461 |
| 4,878,184 | 10/1989 | Okada et al. | 364/557 |
| 4,882,564 | 11/1989 | Monroe et al. | 340/449 |
| 4,970,496 | 11/1990 | Kirkpatrick | 340/585 |
| 5,001,656 | 3/1991 | Zimmerman et al. | 364/557 |
| 5,050,110 | 9/1991 | Rott | 364/557 |
| 5,080,496 | 1/1992 | Keim et al. | 374/144 |

*Primary Examiner*—Ellis B. Ramirez
*Assistant Examiner*—Eric W. Stamber
*Attorney, Agent, or Firm*—Wendell K. Fredericks

[57] ABSTRACT

A microprocessor based temperature determination system for displaying outside ambient temperature inside of an automotive vehicle. The system utilizes sensors for vehicle speed, engine temperature and exterior temperature measurements in order to accurately determine a true temperature indication, taking into account non-ambient heat sources. The temperature displayed to the vehicle's occupants is either the current reading from the exterior temperature sensor, or is an averaged temperature value. The averaged temperature value is determined by averaging the value of the temperature sensor's readings over a ten second interval, taking a sample every one half second.

21 Claims, 3 Drawing Sheets

SYSTEM AND METHOD FOR DETERMINING AMBIENT TEMPERATURE OUTSIDE OF A VEHICLE

FIELD OF THE INVENTION

The present invention relates generally to temperature measurement, and in particular to accurate measurement of ambient temperature of the air outside a vehicle.

BACKGROUND OF THE INVENTION

A system for indicating the ambient air temperature outside of a vehicle typically has a temperature sensor mounted outside of the vehicle, a temperature indicator inside, and a processing means somewhere in between. The temperature signals from the sensor are usually processed in digital format. In order for an accurate ambient temperature reading to be indicated, the system should account for distortions in the temperature sensor measurement due to extraneous heat sources. Some significant sources of thermal distortion are heat conducted from the motor vehicle itself, radiant heat from the ground, and the thermal load from the sun. These distortions in the measured temperature are especially great when the vehicle is either moving at a slow rate of speed or is totally stopped.

The effects of heat conducted from the motor vehicle can be lessened by proper placement of the sensor on the vehicle (preferably towards the front) and appropriately designed insulation. Even with such measures, it is necessary to allow for heating of the sensor by the waste heat from the vehicle's engine, at least when the vehicle is at a standstill. Insulation, although retarding the heating of the sensor, nevertheless has the adverse effect that, for example when the vehicle leaves a garage, the sensor cannot cool from a higher temperature to a lower outside temperature as quickly as without the insulation.

In one solution to this problem, a specific system was developed for vehicles manufactured by Pontiac TM (Pontiac is a registered trademark of General Motors Corporation). In the Pontiac TM system, a vehicle speed sensor is additionally provided and, when the vehicle comes to a stop, the last temperature detected by the outside sensor is indicated inside of the vehicle, and temperature measurements taken during the standstill are ignored. Only after a fixed time delay after the motor vehicle drives on is the temperature last indicated erased and updated with a current temperature reading. The length of the delay time is selected so that the temperature sensor has time to "flush" itself of any heat absorbed during the period of standstill. This delay time can range up to ten minutes.

A disadvantage of a Pontiac-type system is that the delay can be significant in comparison to the time when the temperature sensor is able to indicate a true temperature. Since worst case conditions must be taken into account in determining the fixed delay time, the length of time before a current temperature is displayed is needlessly long. During the delay period, the indicator inside of the vehicle will be displaying (most likely) an erroneous temperature. The temperature measurements from the sensor are totally ignored during the delay, even though the measurements might be accurate.

In another prior art system, a variable update rate (the rate at which the indicated temperature is updated) is employed. If the vehicle has been stopped for less than a fixed amount of time (an hour, for example), the temperature indicating system goes into a slow update mode where the displayed temperature is only allowed to increment at a certain rate (e.g., one degree Celsius per minute). If the vehicle has been stopped for a period of time exceeding the fixed amount, the system goes into a fast update mode where the displayed temperature is the current sensor reading. The system remains in the fast update mode for a second fixed period of time (e.g., five minutes) and then reverts back into the slow update mode. This type of system suffers from the deficiency that the displayed temperature is typically higher than the actual temperature, since the system has not adequately taken into account the effects of the vehicle engine and ground heat.

A third prior art system is a variation on the variable update system except that it incorporated a further sophistication of using vehicle speed and actual engine temperature. If the vehicle is moving at less than a specific speed (e.g., 25 miles per hour), the engine temperature is compared to the current temperature from the outside sensor. If the engine temperature is greater than the outside temperature (as measured by the sensor), the system goes into the slow update mode described above. If the engine temperature is less than the outside temperature, the system enters the fast update mode, directly displaying the sensor temperature. Once the vehicle exceeds the specific speed (e.g., 25 mph) the system automatically switches into the fast update mode. The use of the engine temperature in this system does not determine what temperature to display, it merely aids in setting the proper update rate for the displayed temperature. Although this system attempted to further refine the temperature indication, it still typically indicated a higher temperature than the true outside ambient temperature.

It is, therefore, one object of the invention to provide, in a vehicle, an accurate indication of the outside ambient air temperature.

It is a further object to take into account, in the temperature indication, the effects of thermal distortions such as conducted vehicle heat and radiated ground heat.

SUMMARY OF THE INVENTION

The present invention is an apparatus and a method for accurately determining the ambient temperature outside a vehicle and providing the measured temperature to a display inside the vehicle. The system is microprocessor based and utilizes vehicle speed, time, engine temperature and an exterior temperature sensor measurement as some of the factors in the determination of the temperature which is to be displayed to the occupants of the vehicle. The net result of the systems' operation is to either display the temperature value currently being measured by the exterior temperature sensor system, or to display some other stored or derived temperature.

In order to accomplish the temperature determination, the system uses the above information in order to best evaluate the actual environmental conditions being experienced by the exterior temperature sensor. If the combination of factors indicate that the temperature measurement from the exterior sensor is unreliable, because of non-ambient heat sources, then the system will not display the exterior sensor's temperature and instead it will display an approximate temperature. The approximate temperature is the system's best approximation of the true ambient temperature currently being experienced outside of the vehicle. The approximate temperature is arrived at by averaging the value of the sensor's reading over a ten second period, taking a sample every ½ second. The approximate temperature is in turn used in the determination of the reliability of the current exterior sensor reading.

BRIEF DESCRIPTION OF THE DRAWINGS

For a full understanding of the nature and objects of the invention, reference should be made to the following detailed description in connection with the accompanying drawings in which.

DETAILED DESCRIPTION OF THE PREFERRED EMBODIMENT

Figure 1:
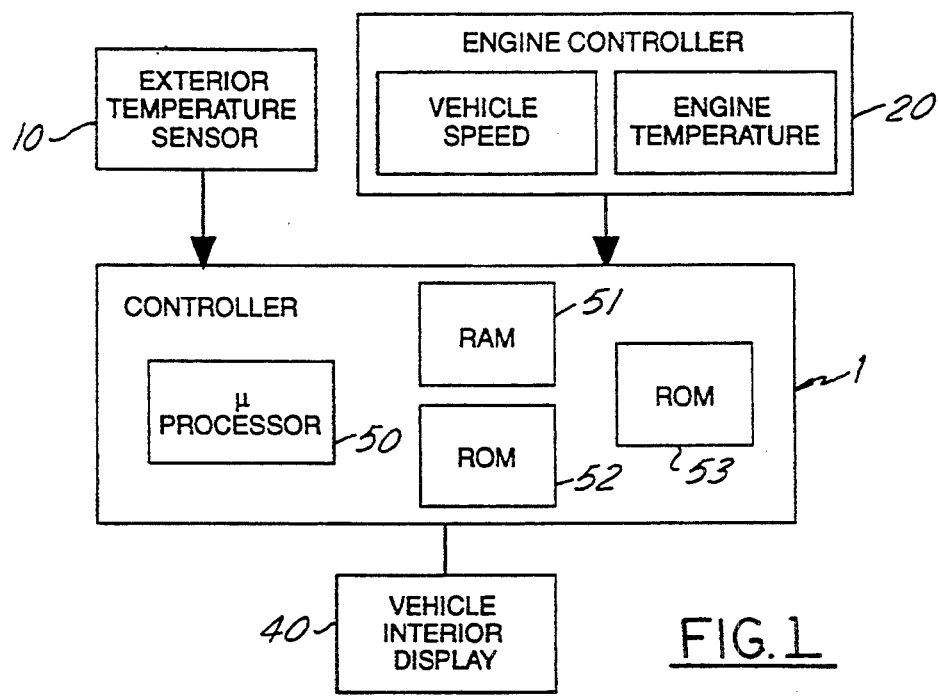
FIG. 1 is a functional block drawing of the preferred embodiment of the ambient temperature display system of the present invention.
Figure 2:
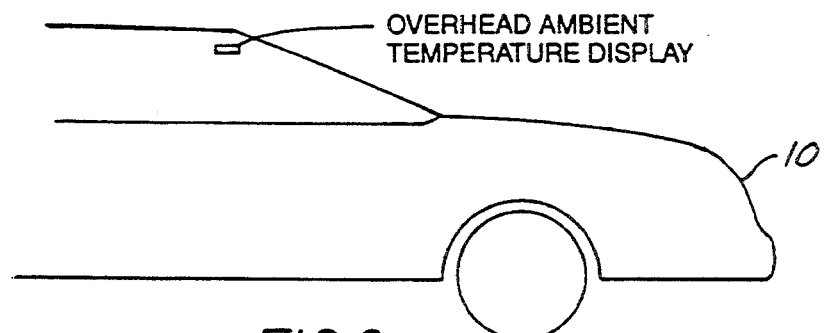
FIG. 2 depicts the preferred placement of the exterior temperature sensor and the interior display.

FIG. 1 depicts, in functional block diagram form, the preferred embodiment of the present invention. The system for determining and displaying the ambient temperature of the exterior air of a vehicle contains an external temperature sensor 10, an engine controller 20 providing vehicle speed and engine temperature information, a temperature indicator controller 1, and a vehicle interior display 40. The temperature indicator microcontroller 1 includes a microprocessor 50, a Random Access Memory (RAM) 51, and Read Only Memories (ROMs) 52 and 53. In the preferred embodiment of the present invention, the microcontroller 1 is model 68HC11 available from Motorola corporation, but any comparable microprocessor will function in this system. The exterior temperature sensor 10 is preferably a negative temperature coefficient (NTC) thermistor device which is mounted on the exterior of the vehicle, such as is depicted in FIG. 2. The output of the sensor is an analog voltage which is then converted to a digital value by an Analog to Digital (A/D) conversion process. The A/D conversion can be accomplished either by a separate unit or, as is depicted in FIG. 1, by the controller, 1, itself. The digital signal is then converted into a temperature measurement via a linear interpolation table. In one embodiment of the present invention, the interpolation table is contained in ROM 53.

The process of the present invention has essentially three different modes of operation: Initial Ignition, ½ Second Periodic Interval, and 1 Second Periodic Interval. The Initial Ignition mode, quite naturally, describes the operation of the system upon initial ignition. The ½ Second Periodic Interval is an operation performed every ½ second the vehicle is being operated. The 1 Second Periodic Interval is an operation which runs concurrently with the ½ Second Interval, but is performed only once per second.

The temperature reading from the exterior sensor, 10, is least reliable when the vehicle has been turned off or stationary for any prolonged length of time. If the vehicle is stationary, the temperature sensor is most likely to be corrupted from heat sources other than the ambient air temperature, such as radiated ground heat or radiated or conducted heat from the vehicle's engine. For this reason, initial ignition of the vehicle presents a unique situation that is handled separately from the normal operation of the system. The unique process performed after initial ignition is illustrated in flowchart form in FIG. 3 and in pseudo-code format in Table 1 below.

TABLE 1

Figure 3:
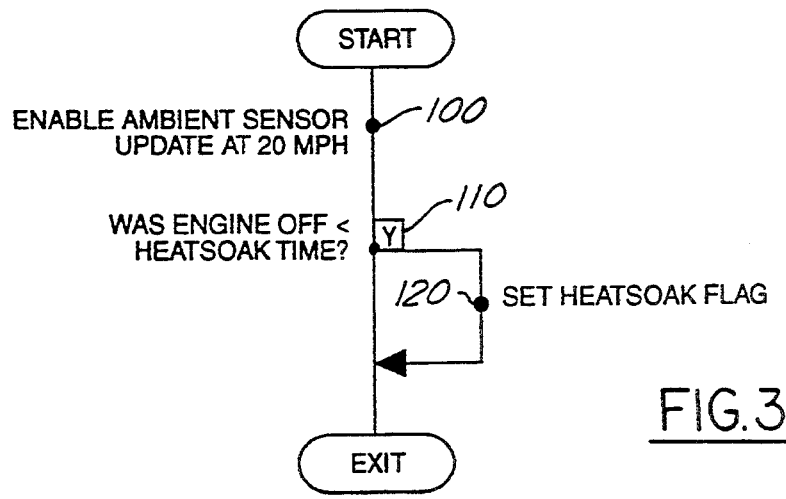
FIG. 3 depicts in flowchart form the operation of the system upon initial ignition of the vehicle.

Upon Ignition Transition to On:
    ;-enable updating of ambient sensor at 20 mph
    ;-if engine off time less than heatsoak time
        ;—set heatsoak flag
        ;-else exit Turning to FIG. 3, upon initial ignition of the vehicle, the first action performed, 100, is to set a flag, called an Ambient 20 MPH Update Flag, which will enable a reading from the exterior temperature sensor, 10, once the vehicle speed has exceeded a predetermined speed (e.g., 20 miles per hour (mph)). This flag alerts the normal processes of the system (see ½ second and 1 second intervals below) that compensation for the condition where the vehicle has entered a warmer temperature area may be required (e.g., from a cool garage area into the midday sun). In decision 110, a test is performed to see if the engine of the vehicle has been turned off more than a first predetermined amount of time, called the heatsoak time. In reading the flow charts depicted in the drawings, intersecting perpendicular lines will indicate a decision. The perpendicular branch is taken if the question asked at the branch location is answered as indicated at the branch. For example, in FIG. 3, the branch at decision 110 will be taken if the answer is YES to the question as to whether the engine has been off for less than the heatsoak time. If the vehicle has been off for less than the first predetermined period of time, called the Heatsoak Time, a second flag, called a Heatsoak Flag, is set (see step 120 in FIG. 3). The Heatsoak Flag indicates to the system that there is a possibility that the exterior temperature sensor 10 has been thermally corrupted by non-ambient heat sources. If the engine has been off for more than the Heatsoak Time, then the Heatsoak Flag is not set. The length of the Heatsoak Time is a constant which can be altered depending on actual operating conditions and experience. A period of 120 minutes has been determined to be the preferred value for the Heatsoak Time. The system is able to keep track of the off time for the vehicle from internal clocks which operate regardless of whether or not the engine is on. The off time can be tracked by initially resetting a counter (not specifically shown in FIG. 1) called the Engine-off Time Counter when the vehicle is turned off, and then updating the counter until the system senses the ignition switch being activated. The counter value can then be compared to the constant value for the Heatsoak Time in order to determine if the Heatsoak Flag should be set.

Once the system has exited the Initial Ignition Mode of operation, the normal modes of operation comprising the ½ Second Interval mode and the 1 Second Interval mode are started. Both of these modes operate concurrently, the ½ Second Interval being performed every ½ second and the 1 Second Interval operating every 1 second.

The ½ Interval process is illustrated in flowchart form in FIG. 4 and in pseudo-code format in Table 2 below.

TABLE 2

```
;-if ambient temp sensor open or shorted
;—set ambient temp sensor fault flag
;—if ambient temp sensor fault not matured
    ;—exit routine
;—else
;-else (if ambient temp sensor not open or shorted)
    ;—clear ambient temp sensor fault flag
    ;-perform ambient sensor linear interpolation
    ;—store result of linear interpolation
    ;-if matured and current ambient temp sensor faults do not exist
    ;-if ambient update at 20 mph flag is set
        ;----if vehicle speed is at or above 20 mph
            ;------clear ambient update flag
            ;------if engine temp is below set point
            ;------force current sensor reading as current ambient temp
            ;------exit routine
            ;------else
        ;------else
    ;—else
    ;-if car not in heatsoak (ambient temp sensor ok to read)
        ;----if engine off for more than 4.25. hours (255 minutes)
            ;------set averaged value to current value
        ;----else if engine not off for more than 4.25 hours and not heatsoak
            ;------if current ambient temp reading < = to averaged reading
            ;------update averaged ambient temperature
            ;------else if speed < 10 mph
            ;------exit routine without updating temp information
            ;------else if speed > 10 mph or current amb temp > avg amb temp
            ;------AMBTMPAV = (AMBTMPAV * 19 + AMBTMPC) / 20
        ;----else exit
    ;—else exit
    ;-else
    ;-replace average AMB temp value with current sensor reading to indicate problem
    ;-exit
```

Figure 4:
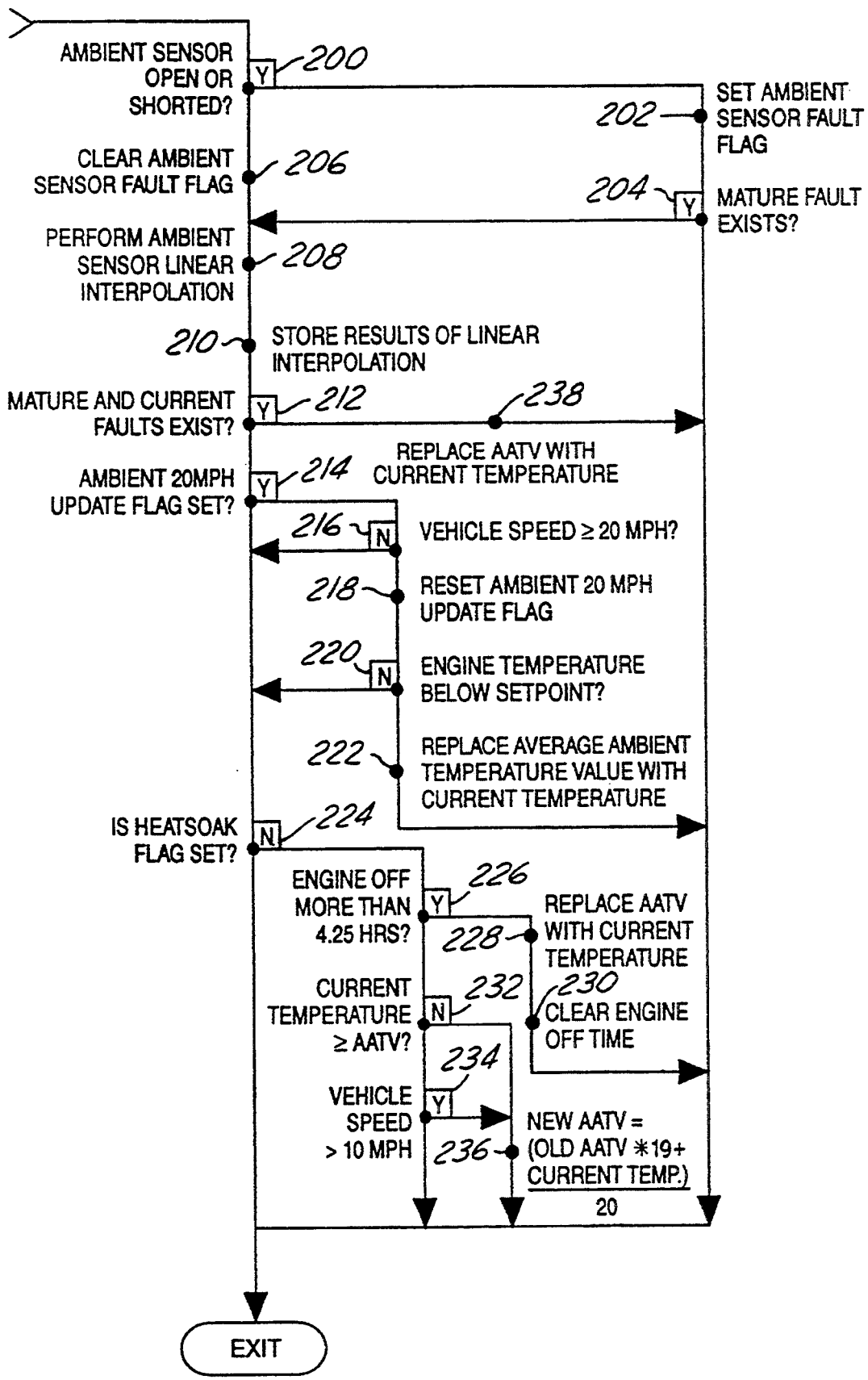
FIG. 4 depicts in flowchart form the operation of the system during the ½ Second Periodic Interval.

The first operation performed in the ½ Second Interval, as illustrated in FIG. 4, is to check to see if there is an open or shorted condition in the circuit to the exterior temperature sensor 10 (see step 200 in FIG.4). This test is performed by examining the digital signal from the sensor 10. The signal will indicate a reading which is out of the normal range of operation if there is a short or open in the circuit. If the test indicates that there is short or open in the sensor circuit, then an Ambient Sensor Fault Flag is set (see step 202). In step 204, a test is performed to see if a mature fault exists. A mature sensor fault is an open or short condition which has persisted for more than ten seconds. When the Ambient Sensor Fault Flag is set, a timer (or a counter) is started in order to see how many bad temperature samples are experienced. The test in step 204 determines if the counter (timer) for mature faults has exceeded the acceptable threshold. If no mature faults exist, no further processing is performed and the ½ second interval process is exited. If a mature fault does exist, processing continues at step 208.

If there is no short or open indication from the exterior temperature sensor 10 the next operation is to clear the Ambient Sensor Fault Flag. The flag might have been set upon a previous execution of the ½ Second Interval process, and upon this execution of the process, the reading from the temperature sensor was valid. If this was the case, the fault flag needs to be cleared in order to allow further processing (see step 206).

In step 208, the digital signal representing the reading from the external temperature sensor 10 is converted (interpolated) into an actual temperature reading. In the preferred embodiment of the present invention, the temperature is converted into degrees Fahrenheit. A scaling factor of 70 is used to allow for negative temperatures. In the preferred embodiment, the linear interpolation is performed by using a lookup table contained in ROM 53. The lookup table contains 10 paired X and Y entries. As a reading from the sensor arrives at the temperature indicator controller 1, it is stored in RAM 51, and the X entries are searched for $X_{HI}$ and $X_{LO}$ values. $X_{LO}$ is the closest entry in the table which is less than the sensor reading, while $X_{HI}$ is the adjacent table entry which is greater than the sensor reading. $Y_{HI}$ and $Y_{LO}$ are the Y entries corresponding to $X_{HI}$ and $X_{LO}$ respectively. The Y entries in the lookup table correspond to temperature values. In order to obtain the temperature value for the sensor reading, a linear interpolation is preformed according to the following equation:

$$Y = Y_{LO} + \frac{(Y_{HI} - Y_{LO}) * (X - X_{LO})}{(X_{HI} - X_{LO})} \qquad (1)$$

where: $X_{HI}$, $X_{LO}$, $Y_{HI}$, $Y_{LO}$ are as described above, X is the sensor reading and Y is the corresponding temperature value for the sensor reading.

Once the linear interpolation has been performed, the current ambient temperature reading from the exterior sensor is stored either in a register in the microprocessor 50 itself, or in RAM 51 (see step 210). The next test, seen in step 212 in FIG. 4, is to determine if there are matured and current sensor faults. A mature sensor fault is an open or shortened condition which has existed for a period of time (10 seconds for example). A mature fault indicates that there is a problem either in the sensor 10 itself, or in some other part of the system. If there are mature and current sensor faults, the Average Ambient Temperature Value (AATV) is replaced by the current temperature reading from the exterior sensor 10 (see step 238). A complete description of the AATV will follow below, but essentially the AATV is an average value of all of the temperature readings over the last 10 seconds. The AATV is stored in the memory of the system, in RAM 51. If there are mature and current sensor faults, the current temperature reading (stored back in step 210) will most likely contain a value of −70° F. or +185° F. (the two extremes in the interpolation process of step 208). These temperature extremes correspond to the open or short conditions. The purpose of replacing the AATV with the extreme (and erroneous) temperature is to indicate a failure condition to the vehicle operator. This also aids in properly servicing the vehicle. Once the AATV has been replaced (step 238), the ½ second interval process is exited.

The next step in the process, 214, is to check to see if the Ambient 20 MPH Update Flag has been set (during the Initial Ignition Mode, see above). If the flag has not been set, processing continues at step 224 in FIG. 4. If the Ambient 20 MPH Flag has been set, the process enters an Ambient Update routine depicted in steps 216-222. The first test, 216, in the Ambient Update routine is to determine if the vehicle speed has exceeded a first threshold speed. In the preferred embodiment, the first threshold speed is 20 mph. The vehicle speed originates from the engine controller module (element 20 in FIG. 1). In the preferred embodiment of the present invention, the vehicle speed information is based upon a series of pulses received by the engine controller module 20 from a transmission module of the vehicle (not depicted in FIG. 1). The transmission module senses the vehicle speed and sends the engine controller module 20 the series of pulses. The frequency of the pulses is a function of the vehicle speed. The engine controller module 20 converts the signal from the transmission module into an actual velocity reading in miles per hour which is then sent to the temperature controller 1 for its use in the present invention.

If the vehicle speed has not yet exceeded the 20 mph mark, then the process exits the Ambient Update routine and returns to the main line of processing as depicted at step 216 in FIG. 4. If the vehicle speed presently exceeds 20 mph, the Ambient 20 MPH Update Flag is cleared at step 218. The next test in the routine is to determine if the engine temperature has exceeded a predetermined value called a setpoint (see step 220). The engine temperature is provided to the temperature indicator controller 1 from the engine controller module 20 as depicted in FIG. 1. The temperature from the engine controller module 20 is based upon a reading from a thermistor (not shown in FIG. 1) placed in the engine block of the vehicle. The thermistor measures the temperature of the engine coolant in order to provide the indication of engine temperature. In the preferred embodiment of the present invention, the temperature information sent to the controller 1 from the engine controller module 20 is scaled as degrees Celsius (C.)+128. This means that a temperature of 22° C. would be received by the controller as a value of 150. As with the exterior temperature sensor conversion, the A/D conversion and the linear interpolation can be performed either by the temperature indicator controller 1 itself, or by an external unit (such as with the speed information from the engine controller module 20).

If the engine temperature has exceeded the setpoint, the Ambient Update routine is exited at step 220 and processing continues at step 224. In the preferred embodiment of the present invention, the setpoint is a constant of approximately 109° F. If the engine temperature has exceeded this setpoint, then the temperature reading taken once the vehicle has exceeded 20 mph is not treated differently than any other temperature reading because the sensor has most likely been corrupted by the engine heat and is, therefore, not a true indication of ambient temperature. If the engine temperature has not exceeded the setpoint, AATV is replaced (see step 222) by the current sensor temperature (stored back in step 210). After the AATV has been forced to the current temperature reading the ½ second interval process is exited.

In step 224 in FIG. 4, the status of the Heatsoak Flag is checked in order to determine if any special processing must take place because of a heatsoak condition. Recall that the Heatsoak Flag is set if certain conditions indicate that the reading from the external temperature sensor 10 may have been corrupted from extraneous heat sources. One of the conditions already described which causes the setting of the Heatsoak Flag is when the vehicle has been turned off for less than a predetermined amount of time, the heatsoak time (see FIG. 3). If the Heatsoak Flag is set, the ½ Second Interval process is exited and the condition which caused the Heatsoak Flag to be set will be addressed in the 1 Second Interval process (see FIG. 5 and description below).

If the Heatsoak Flag has not been set, the system, as indicated in step 226, determines whether or not the engine has been turned off for more than a second predetermined amount of time (the first predetermined amount of time is the heatsoak time as described above in the Initial Ignition mode of operation). In the preferred embodiment of the present invention, the second predetermined amount of time is approximately 4.25 hours (255 minutes). If the engine has been off more than the 4.25 hours, the AATV is replaced in step 228 with the current sensor reading (stored in step 210 above). Once the current sensor reading has replaced the AATV in step 228, the engine off time counter is cleared (step 230) and the ½ Second Interval process is exited.

If the engine has not been off for more than the second predetermined amount of time (step 226), the current ambient temperature is compared to the AATV in step 232. If the current temperature reading from the exterior temperature sensor 10 is less than the AATV, then a new AATV is calculated in step 236. The formula for the average is as follows:

$$\text{new } AATV = \frac{(\text{old } AATV * 19 + \text{current temperature})}{20} \quad (2)$$

Since the ½ Interval samples 2 temperature readings per second, the above formula will, therefore, represent the average of the temperature readings over the previous ten seconds. The purpose of the averaging is to filter and/or smooth the temperature readings from the exterior sensor, 10. The AATV will prevent "spikes" of "bad" temperature data from being displayed. A "bad" temperature reading might have been taken, for example, if the vehicle momentarily passed through the hot exhaust of another vehicle. Higher (or lower) readings like these will be filtered out using the averaging method described here. The averaging also provides the additional advantage of smooth display to the vehicle occupants. It would be undesirable to either update the display with every ½ second sample or, alternatively, to display an old value which does not take into account the newest temperature reading. Once the new average has been calculated, the AATV is stored back in memory and the ½ Interval is exited.

If the current temperature reading is greater than the AATV (step 232), then the temperature reading is somewhat suspect in that the sensor 10 might have absorbed heat from a non-ambient source. Therefore, when the current temperature is greater than the AATV, the system checks to see if the vehicle is travelling greater than a second threshold speed (step 234). In the preferred embodiment of the present invention, the second threshold speed is 10 mph. If the speed is greater than 10 mph, then it is most likely that the temperature sensor was not corrupted by a non-ambient source (such as engine or ground heat) and a new AATV is calculated in step 236. If the vehicle is travelling less than the threshold speed of 10 mph, the sensor reading is not relied upon and the ½ Second Interval is exited.

The 1 Second Interval mode of operation is essentially directed at detecting conditions which would cause the Heatsoak Flag to be set, and taking actions which enable the clearing of the flag. The 1 Second Interval process is illustrated in flowchart form in FIG. 5, and in pseudo-code format in Table 3 below.

TABLE 3

```
;-IF VEHICLE SPEED < 10 mph
  ;—increment "vehicle speed < 10 mph"
timer
    ;—if vehicle speed has been < 10 mph for
10 seconds
      ;——set heatsoak flag
    ;-else if vehicle speed bit < 10 mph then
clear "vehicle speed < 10 mph" timer
      ;-if car is heatsoaked
        ;—increment flush timer
        ;—if vehicle speed < 5 mph
          ;——clear flush timer
        ;—else if vehicle speed has been above 5
mph for long enough
          ;—flush time = 145 - (vehicle speed - 5
mph * 1) seconds
        ;—or if current ambient temp < avg amb
temp;
          ;——clear heatsoak flag
          ;——clear heatsoak timer
      ;—else
    ;-else exit
```

Figure 5:
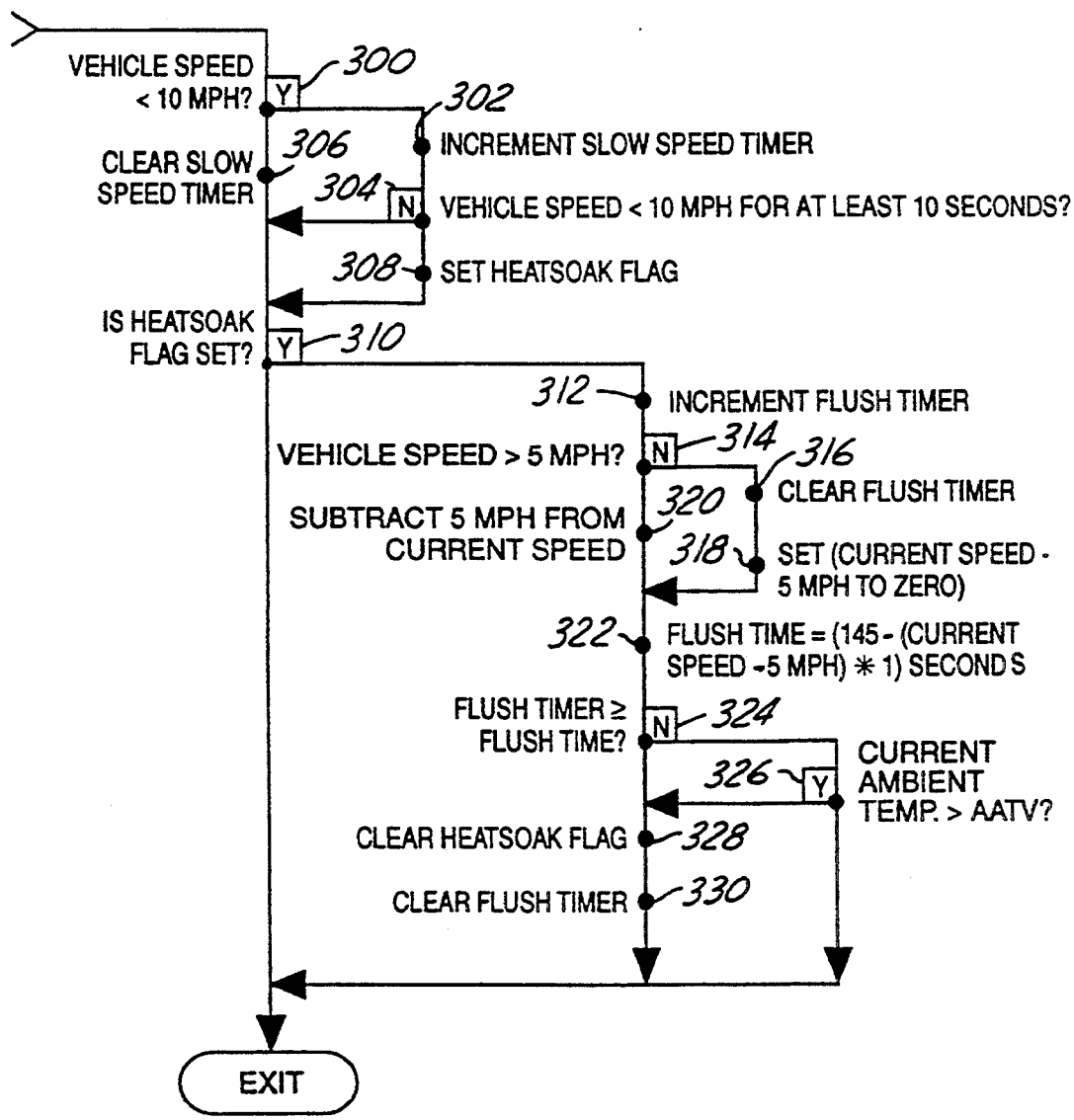
FIG. 5 depicts in flowchart form the operation of the system during the 1 Second Periodic Interval.

The initial test in the 1 Second Interval contained in step 300 in FIG. 5, is to detect whether or not the vehicle is travelling less than a second threshold speed. In the preferred embodiment, the second threshold speed for the vehicle has been set at 10 mph. If the vehicle is travelling less than then the second threshold speed, the current temperature reading is suspect and the process tests whether or not the vehicle has been travelling less than the second threshold speed for a third predetermined amount of time (see step 304). First though, a slow speed timer is updated in step 302. The slow speed timer (counter) will keep track of how long the vehicle has been travelling slower than the second threshold speed. In the preferred embodiment, the third predetermined amount of time is 10 seconds. If the vehicle has been travelling less than 10 mph for less than ten seconds (as indicated by the slow speed timer), then processing resumes at step 310. If the vehicle has been going slower than 10 mph for at least ten seconds, then the Heatsoak Flag is set in step 308. The Heatsoak Flag is set because the combination of the slow speed and the extended period of time has most likely corrupted the temperature reading from the temperature sensor 10 of FIG. 1.

If the vehicle is not travelling less than the second threshold speed (step 300 of FIG. 5), the slow speed timer is cleared. The next step in the process, 310, is to check whether or not the Heatsoak Flag has been set. If the flag has not been set, the 1 Second Interval mode is exited. If the Heatsoak Flag has been set, a process called a Flush routine is executed (steps 312–330). The purpose of the Flush routine is to inhibit use of the current temperature reading from the exterior temperature sensor, 10, until the sensor has had the opportunity to "flush" itself of the non-ambient heat which is corrupting the current temperature reading. The amount of time which the present invention estimates is required for sensor flushing to occur is called the Flush Time. The Flush routine starts by incrementing a Flush Timer (step 312). The Flush Timer measures the time which has elapsed since the external sensor, 10, began the flushing process. The Flush Timer can be implemented as a counter.

The first test in the Flush routine is to determine if the vehicle is travelling greater than a third threshold speed. In the preferred embodiment, the third threshold speed is 5 mph. If the vehicle speed is less than the third threshold speed, the Flush Timer is cleared (step 316) and the variable "current speed—5 mph" is set to zero in step 318 (see step 322 for use of the variable). If the vehicle speed was greater than 5 mph, the variable "current speed—5 mph" is determined for use in step 322.

In step 322, the Flush Time is determined. Recall that the Flush Time is the estimated time which is required for the sensor, 10, to flush the non-ambient heat which is corrupting the current temperature reading. The Flush Time is determined by the function:

(3)
Flush Time $\triangleq$ FT
Maximum Flush Time = MFT
Current Speed $\models$ CS
Flush Speed $\models$ FS
weighting factor $\models W_f$
FT = (MFT − (CS − FS)*$W_f$)

In the preferred embodiment of the invention, the Maximum Flush Time is 145 seconds, the Flush Speed is 5 mph and the weighing factor is 1. The purpose of this function is to take into account the cooling effect of a faster rate of travel, and accordingly reduce the time which is estimated for the flushing to occur. In the preferred embodiment with the above values, the Flush Time is reduced 1 second for every 1 mph which the vehicle exceeds 5 mph. For example, if the current speed is 40 mph, the Flush Time would be 120−(40−5) or 85 seconds. If the vehicle speed was increased to 45 mph, the Flush Time would decrease to 80 seconds. The flush time is recalculated during every execution of the 1 Second Interval if the Heatsoak Flag is set.

In step 324, the current Flush Timer value is compared to the Flush Time. If the Flush Timer is equal to, or exceeds the Flush Time, the Heatsoak Flag and the Flush Timer are cleared (see steps 328 and 330) because the estimated time required to flush the sensor 10 has elapsed, and the flag and the timer are no longer required. If the Flush Timer has still not reached the Flush Time, the process still checks to see if the current ambient temperature is less than the AATV in step 326. If the current temperature is less than the AATV, then the flushing process proceeded more quickly than estimated, and the Heatsoak and Flush Timer can both be cleared (see steps 328,330). On the other hand, if the Flush Timer has not yet reached the Flush Time and the current temperature reading is greater than the AATV, the flush process is not complete, and the 1 Second Interval process must be repeated the next second. If the 1 Second Interval process cleared the Heatsoak Flag, the next occurrence of the ½ Second Interval will use the current temperature in its process.

The ambient temperature information is displayed on a three (3) digit seven segment electronic display, element 40 in FIG. 1. This display also contains a minus (−) segment to indicate negative temperatures. The controller 1 converts the AATV information stored in memory, into individual digits (0–9) for each numerical position (ones, tens and hundreds) and then lights the display segments corresponding to these digits (0–9) for each position (ones, tens, and/or hundreds). The pseudo code for driving the actual display from the AATV register/memory location is shown in Table 4 below.

TABLE 4

```
;-subtract 70 from AATV
;-if result is negative
;—negate result to get positive value
;—set negative sign flag in RAM
;-else
;-do
;—subtract 100 from AATV
;—increment hundreds place counter
;-while result is not negative
;-end do
;-add 100 to AATV to make positive number
;-decrement hundreds place counter to
adjust for extra subtraction
;-do
;—subtract 10 from AATV
;—increment tens place counter
;-while result is not negative
;-end do
;-add 10 to AATV to make positive number
;-decrement tens place counter to adjust
for extra subtraction
;-save result as ones place value
;-update display with counter values
;-if negative sign flag in RAM is set
;—turn on negative sign in display
;-else turn off negative sign in display
;-exit
```

Having thus described the present invention, it is to be understood that the above described methods and apparatus are illustrative of the principles of the present invention, and that other methods and apparatuses may be devised by those skilled in the art without departing from the spirit and scope of the invention.

We claim:

1. A method of automatically displaying on a display device in a vehicle, an indication of an ambient air temperature outside of said vehicle comprising the steps of:

detecting a current temperature signal from a temperature device mounted exterior to said vehicle;

comparing in a comparator device said current temperature signal to an average temperature signal, said average temperature signal being an average of said current temperature signal over an averaging period of time;

displaying on said display device a current temperature related to said current temperature signal if said current temperature signal is less than said average temperature signal;

determining a new average temperature signal and displaying a new average temperature value related to said new average temperature signal if said current temperature signal is greater than said new average temperature signal;

detecting a heatsoak condition when predetermined conditions exist indicating that the current temperature signal has been influenced by absorption of non-ambient heat; and displaying said new average temperature value if said heatsoak condition is detected.

2. A method according to claim 1 further comprising the steps of:

setting a heatsoak flag when a heatsoak condition is detected;

testing for said heatsoak flag being set; and wherein the step of displaying said new average temperature value is performed if said heatsoak flag is set.

3. A method according to claim 2 further comprising repeating the following steps until said heatsoak flag is cleared:

incrementing a value in a flush timer if said heatsoak flag is set;

sampling a speed of said vehicle;

determining a flush time based upon said speed of said vehicle;

comparing said flush time to said value in said flush timer; and clearing said value in said flush timer and clearing said heatsoak flag if said flush time exceeds said value in said flush timer.

4. A method according to claim 2 further comprising the steps of:

sampling a speed of said vehicle for a predetermined period of time; and setting said heatsoak flag if said vehicle has traveled less than a threshold speed for the duration of said predetermined period of time.

5. A method according to claim 4 wherein said predetermined period of time is 10 seconds and said threshold speed is ten miles per hour.

6. A method according to claim 2 further comprising the steps of:

setting said heatsoak flag if said vehicle has been off greater than an off time threshold.

7. A method according to claim 6 wherein said off time threshold is approximately two hours.

8. A method of automatically displaying on a display device in a vehicle, an indication of an ambient air temperature outside of said vehicle comprising the steps of:

detecting a current temperature signal from a temperature device mounted exterior to said vehicle;

comparing in a comparator device said current temperature signal to an average temperature signal, said average temperature signal being an average of said current temperature signal over an averaging period of time;

displaying on said display device a current temperature related to said current temperature signal if said current temperature signal is less than said average temperature signal;

determining a new average temperature value and displaying said new average temperature value if said current temperature is greater than said new average temperature value;

testing said temperature device for an open or shorted condition; and displaying said new average temperature value if said open or shorted condition exists.

9. A method according to claim 8 further comprising the steps of:

testing whether said open or shortened condition has occurred for longer than a mature period of time;

displaying said current temperature if said open or shortened condition has occurred for longer than said mature period of time.

10. A method according to claim 9 wherein said mature period of time is 10 seconds.

11. A method of displaying on a display device in a vehicle, an indication of an ambient air temperature outside of said vehicle comprising the steps of:

detecting a current temperature signal from a temperature device mounted exterior to said vehicle;

comparing in a comparator device said current temperature signal to an average temperature signal, said average temperature signal being an average of said current temperature signal over an averaging period of time;

displaying on said display device a current temperature related to said current temperature signal if said current temperature signal is less than said average temperature signal;

determining a new average temperature signal and displaying a new average temperature value related to said new average temperature signal if said current temperature signal is greater than said new average temperature signal;

setting an Update Flag upon initial ignition of said vehicle;

comparing a speed of said vehicle to a first threshold speed if said Update Flag is set;

comparing a temperature of an engine of said vehicle to a setpoint if said speed of said vehicle exceeds said first threshold; and displaying said current temperature if said temperature of said engine is less than said setpoint.

12. A system for displaying, in a vehicle, an indication of an ambient air temperature outside of said vehicle comprising:

an external temperature sensor mounted on said vehicle, said external temperature sensor providing as an output a signal indicative of a current temperature;

an engine controller module, said engine controller module providing a signal indicative of a speed of said vehicle;

a temperature indicator controller having a microprocessor and a memory, said temperature indicator controller having as inputs said signals indicative of said current temperature and said speed of said vehicle;

a display device mounted inside said vehicle, said display device being connected to said temperature indicator controller;

a means in said temperature indicator controller for determining an average temperature value, said average temperature value being an average of said current temperature signals over an averaging period of time;

a decision means in said temperature indicator controller for providing either said current temperature or said average temperature value to said display device;

a fault detection means for detecting open or shorted conditions of said external temperature sensor; and wherein said decision means is responsive to said fault detection means for displaying said average temperature value if said fault detection means detects an open or shorted condition in said external temperature sensor.

13. A system according to claim 12 wherein:

said decision means is further responsive to said fault detection means for displaying said current temperature if said open or shortened condition has persisted for longer than a mature period of time.

14. A system for displaying, in a vehicle, an indication of an ambient air temperature outside of said vehicle comprising:

an external temperature sensor mounted on said vehicle, said external temperature sensor providing as an output a signal indicative of a current temperature;

an engine controller module, said engine controller module providing a signal indicative of a speed of said vehicle;

a temperature indicator controller having a microprocessor and a memory, said temperature indicator controller having as inputs said signals indicative of said current temperature and said speed of said vehicle;

a display device mounted inside said vehicle, said display device being connected to said temperature indicator controller;

a means in said temperature indicator controller for determining an average temperature value, said average temperature value being an average of said current temperature signals over an averaging period of time;

a decision means in said temperature indicator controller for providing either said current temperature or said average temperature value to said display device;

an engine temperature sensor mounted to an engine of said vehicle, said engine temperature sensor providing a signal indicative of a temperature of said engine; and wherein said decision means is responsive to said engine controller module and said engine temperature sensor for displaying said current temperature if said speed of said vehicle exceeds a threshold speed and said engine temperature is below a setpoint temperature.

15. A system according to claim 14 wherein said threshold speed is approximately twenty miles per hour and said setpoint temperature is approximately one hundred and nine degrees Fahrenheit.

16. A system for displaying, in a vehicle, an indication of an ambient air temperature outside of said vehicle comprising:

an external temperature sensor mounted on said vehicle, said external temperature sensor providing as an output a signal indicative of a current temperature;

an engine controller module, said engine controller module providing a signal indicative of a speed of said vehicle;

a temperature indicator controller having a microprocessor and a memory, said temperature indicator controller having as inputs said signals indicative of said current temperature and said speed of said vehicle;

a display device mounted inside said vehicle, said display device being connected to said temperature indicator controller;

a means in said temperature indicator controller for determining an average temperature value, said average temperature value being an average of said current temperature signals over an averaging period of time;

a decision means in said temperature indicator controller for providing either said current temperature or said average temperature value to said display device;

a heatsoak detection means for detecting a heatsoak condition, said heatsoak condition occurring when said signal from said external temperature sensor is unreliable due to absorption of non-ambient heat, said heatsoak detection means setting a heatsoak flag if said heatsoak condition occurs; and wherein said decision means is responsive to said heatsoak flag for displaying said average temperature value if said heatsoak flag is set.

17. A system according to claim 16 wherein said heatsoak detection means is responsive to said engine controller module for setting said heatsoak flag if said speed of said vehicle is below a lower threshold speed for a slow speed threshold period of time.

18. A system according to claim 17 wherein said lower threshold speed is approximately ten miles per hour and said slow speed threshold period of time is approximately ten seconds.

19. A system according to claim 16 further comprising:
an engine off timer, said engine off timer providing an indication of an amount of time said vehicle has been turned off; and
wherein said heatsoak detection means is responsive to said engine off timer for setting said heatsoak flag if said amount of time said vehicle has been turned off is less than an off time threshold period of time.

20. A system according to claim 19 wherein said off time threshold period of time is approximately 120 minutes.

21. A system according to claim 16 further comprising a sensor flush means for clearing said heatsoak flag after said heatsoak flag is set, said sensor flush means comprising:
a cumulative timer indicating a cumulative time, said cumulative timer being reset upon said setting of said heatsoak flag;
a means for determining an approximate flush time, said approximate flush time being an estimate of an amount of time said external temperature sensor requires to flush said absorbed non-ambient heat;
a means for comparing said approximate flush time to said cumulative time; and
a means for clearing said heatsoak flag if said approximate flush time exceeds said cumulative time.

* * * * *